US005271155A

United States Patent [19]

Fuchs et al.

[11] Patent Number: 5,271,155

[45] Date of Patent: Dec. 21, 1993

[54] HAND CIRCULAR SAW

[75] Inventors: Wolfgang Fuchs, Filderstadt; Rainer Schilling; Heribert Schramm, both of Stuttgart; Claus Kemmner, Aichtal-Neuenhaus, all of Fed. Rep. of Germany

[73] Assignee: Robert Bosch GmbH, Stuttgart, Fed. Rep. of Germany

[21] Appl. No.: 918,270

[22] Filed: Jul. 22, 1992

[30] Foreign Application Priority Data

Jul. 22, 1991 [DE] Fed. Rep. of Germany ....... 4124233

[51] Int. Cl.[5] ........................ B23D 47/02; B23D 51/02

[52] U.S. Cl. ......................................... 30/376; 30/377

[58] Field of Search ................. 30/375, 376, 377, 391; 144/136

[56] References Cited

U.S. PATENT DOCUMENTS

| | | | |
|---|---|---|---|
| 3,262,472 | 7/1966 | McCarty et al. | 30/376 |
| 3,977,080 | 8/1976 | Allaire . | |
| 4,290,464 | 9/1981 | Marsan | 30/376 |
| 4,589,208 | 5/1986 | Iwasaki et al. | 30/376 |
| 4,999,916 | 3/1991 | Sistare | 30/376 |
| 5,010,651 | 4/1991 | Techter et al. | 30/377 |
| 5,121,545 | 6/1992 | Honaka et al. | 30/377 |

FOREIGN PATENT DOCUMENTS

| | | | |
|---|---|---|---|
| 2096942 | 10/1982 | United Kingdom | 30/376 |
| 2182280 | 5/1987 | United Kingdom | 30/376 |

*Primary Examiner*—Douglas D. Watts
*Assistant Examiner*—Paul M. Heyrana
*Attorney, Agent, or Firm*—Michael J. Striker

[57] ABSTRACT

A motor driven hand circular saw has a base plate arranged to be positioned over a workpiece, and a saw blade which is displaceable parallel and tiltably about a turning axle relative to the base plate for performing inclined or bevel cuts so that by tilting of the saw blade relative to the base plate about the axle, the saw blade and the axle are displaced parallel to the base plate with a stroke which is proportional to a respective tilting angle transversely to a direction downstream of a cutting point and counteracts a natural displacement of a saw engaging line of the saw blade on the workpiece.

21 Claims, 2 Drawing Sheets

FIG.3
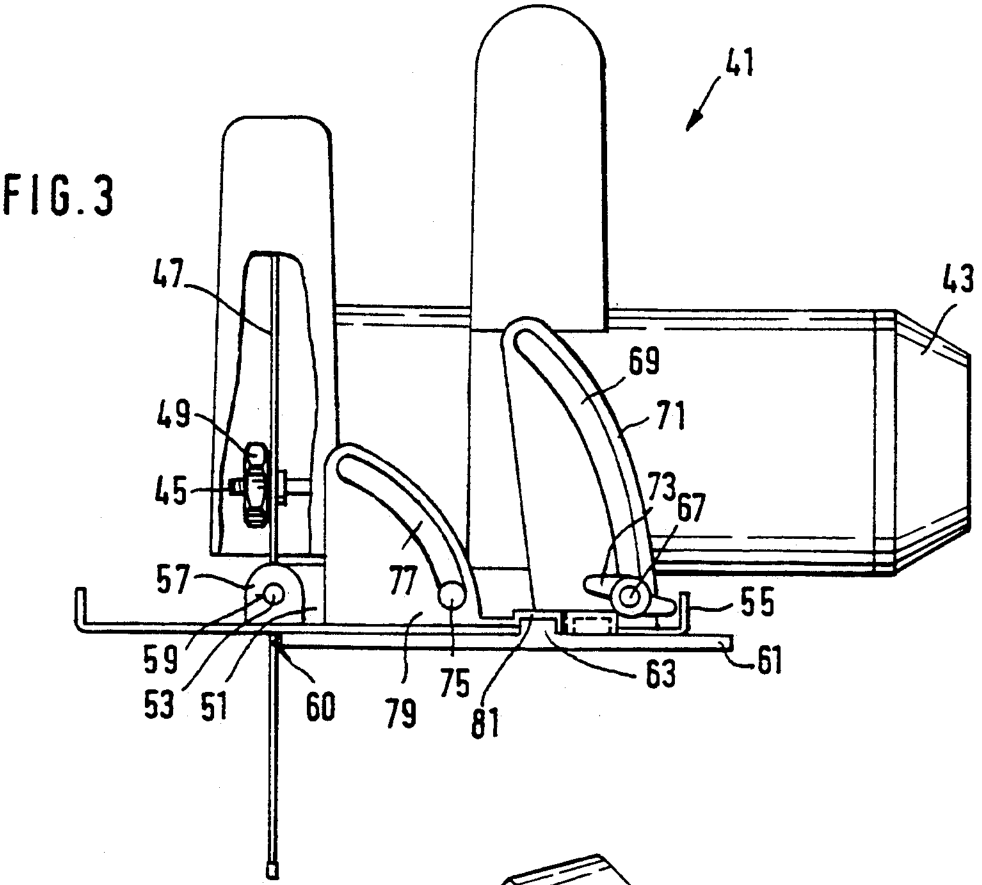
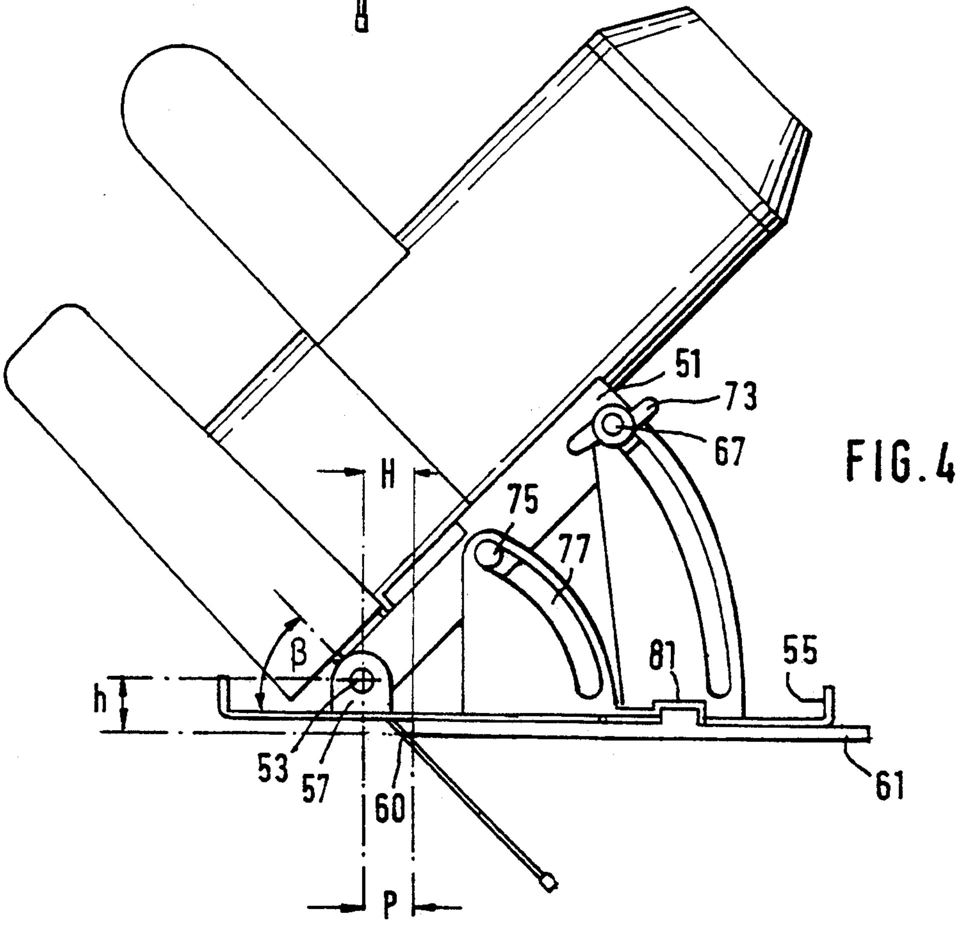
FIG.4

HAND CIRCULAR SAW

BACKGROUND OF THE INVENTION

The present invention relates to a hand circular saw. More particularly, it relates to a hand circular saw which has a motor housing accommodating a motor connected with a saw shaft which supports a saw blade, and a base plate, as well as a physical turning axle for inclined or beveled cuts.

Hand circular saws of the above mentioned general type are known in the art. One of such saws is disclosed for example, in the U.S. Pat. No. 3,977,080. It is turnable relative to a base plate about a physical axle extending parallel to the base plate and to the saw blade plane for performing inclined or bevel cuts. The base plate carries on its lower side a throughgoing U-shaped groove. With the groove, the base plate can engage the guiding rib of a guiding rail and move on the guiding rail along its longitudinal edges. Thereby a guided feed for the hand circular saw is possible. For straight cuts, the outer edge of the guiding rail extending normal to the workpiece surface must be positioned near the saw blade. For inclined cuts, approximately 45° cuts the outer edge extending at an acute angle to the workpiece plane must be positioned near the saw blade. These two possible different working positions of the guiding rail for the hand circular saw are produced in that, the guiding ribs of the guiding rail extend parallel to the longitudinal edges but offset relative to the center by a certain distance. This distance corresponds to the half distance of the two engagement lines of 90° to 45°. This distance is produced due to the turning axis located over the upper surface of the workpiece.

The handling of this hand circular saw with the guiding rail is quite complicated. The two different positions of the guide rail relative to the hand circular saw for straight and inclined cuts are easily exchangeable. During the inclined cut the tool can hit the guiding rail and damage the latter or during the straight cut downward clamping action of the edge located near the tool can be lost by excessive distance from the tool.

The desired condition in which a parallel displacement of the tool engagement line does not occur is obtained in that, instead of a physical turning axle a coulisse-like turning guiding means are used. The guiding paths of the turning guiding means have a center of curvature located on the upper surface of the workpiece and virtually defining the turning axis. With the loss of the physical turning axle, the advantage of the special robustness, simple manufacture as well as handling of the hand circular saw are lost.

SUMMARY OF THE INVENTION

Accordingly, it is an object of the present invention to provide a hand circular saw which avoids the disadvantages of the prior art.

In keeping with these objects and with others which will become apparent hereinafter, one feature of the present invention resides, briefly stated, in a motor driven hand circular saw which is formed so that by turning the saw blade the saw blade is displaceable with a stroke H proportional to a corresponding turning angle transversely to the feed direction, or in other words, the direction downstream of a cutting point so as to counteract natural and usually unavoidable displacement of the tool engaging line of the saw blade on the workpiece.

When the hand circular saw is designed in accordance with the present invention it has the disadvantage that, with maintaining a physical turning axle and thereby all other advantages, with low structural and manufacturing expenses which are lower than in the case of hand circular saws with not-physical turning axes, a hand circular saw is designed so that the special robustness and high accuracy are combined and it is easy to handle . Also for all turning angular positions a single, common tool engaging line is provided, and thereby undesired damages to the guiding rail during turning of the saw blade are not possible and the cutting suppression is secured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing the hand circular circular saw in accordance with a second embodiment of the invention in a normal position of the saw blade; and FIG. 4 is a view showing the hand circular saw of the second embodiment with the saw blade in 45° position; and FIGS. 5 and 6 show further modifications of the invention.

DESCRIPTION OF THE PREFERRED EMBODIMENTS

Figure 1:
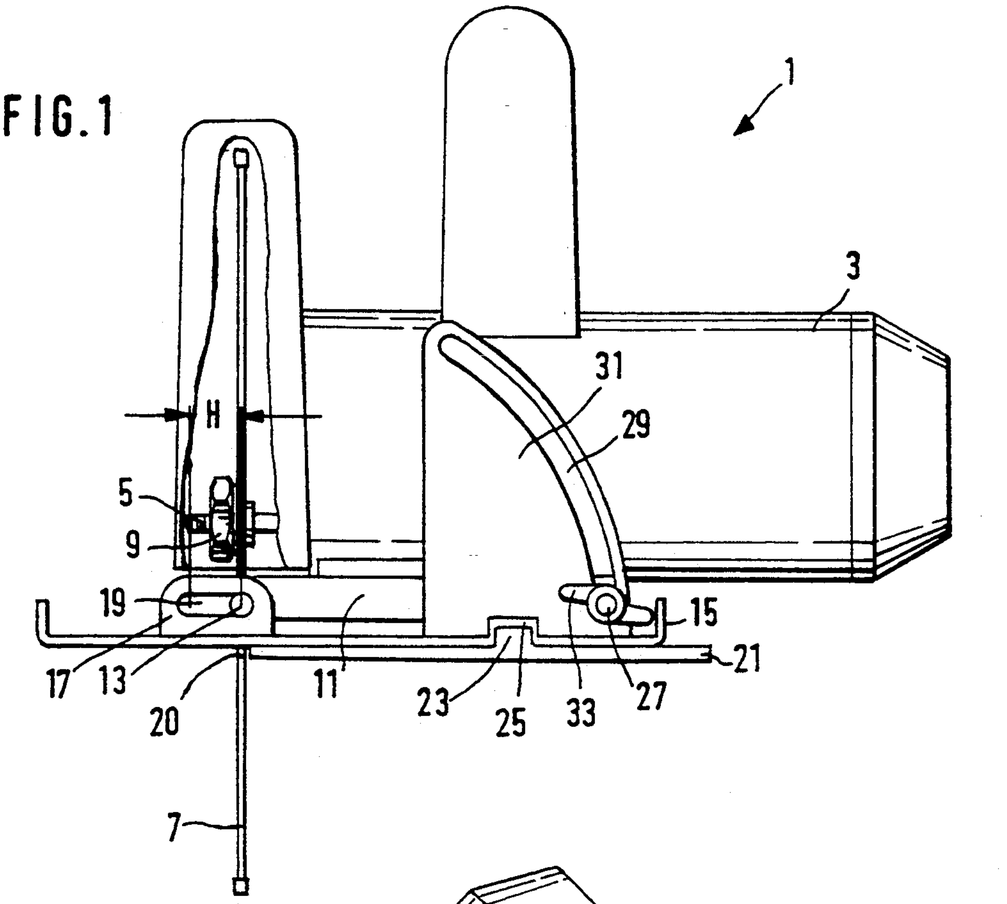
FIG. 1 is a side view schematically showing a hand circular saw in accordance with the present invention in normal position of a saw blade.

A hand circular saw shown in FIG. 1 is identified as a whole with reference numeral 1. It has a motor housing 2 which accommodates a not shown motor connected with a saw shaft 5. A saw blade 7 is arranged on the saw shaft and secured by a nut 9.

The motor housing 3 is mounted on a frame-like turning bridge 11. The turning bridge 11 carries a physical turning (or tilting) axle 13 in a turning-fixed manner and is turnably (tiltably) connected through the axle 13 with a base plate 15. The turning axles 13 are held on the base plate 15 in a bearing block 17 located on the base plate, and in particular in an elongated opening 19. The opening 19 extends transversely to the feed direction. The turning axle 13 is supported in the elongated opening 19 in a rotatable fashion and displaceable by a predetermined stroke H. The elongated hole 19 is somewhat longer than the stroke H. The tool engagement line or action line 20 is identified with a point. The base plate 15 is supported on a guiding rail 21 and engages its guiding rib 23 with a U-shaped groove 25.

The turning bridge 11 at its side opposite to the turning axle 13 carries a screw pin 27 which acts as a displacement sliding block. The pin 27 engages through a displacement-turning guiding path 29 of a displacement coulisse sheet 31 arranged fixedly on the base plate 15. The turning bridge is arrestable in each turning position between 90° and 45° on the displacement coulisse sheet 31 by means of the screw pin 27 through a wind nut 23.

The motor housing 3 together with the saw blade 7 is arranged on the turning bridge 11 turnably up and down for adjusting the cutting depth. The arrangement is not shown in detail. A swinging hood and a gap wedge which are conventional for the hand circular saws are not shown as well.

Figure 2:
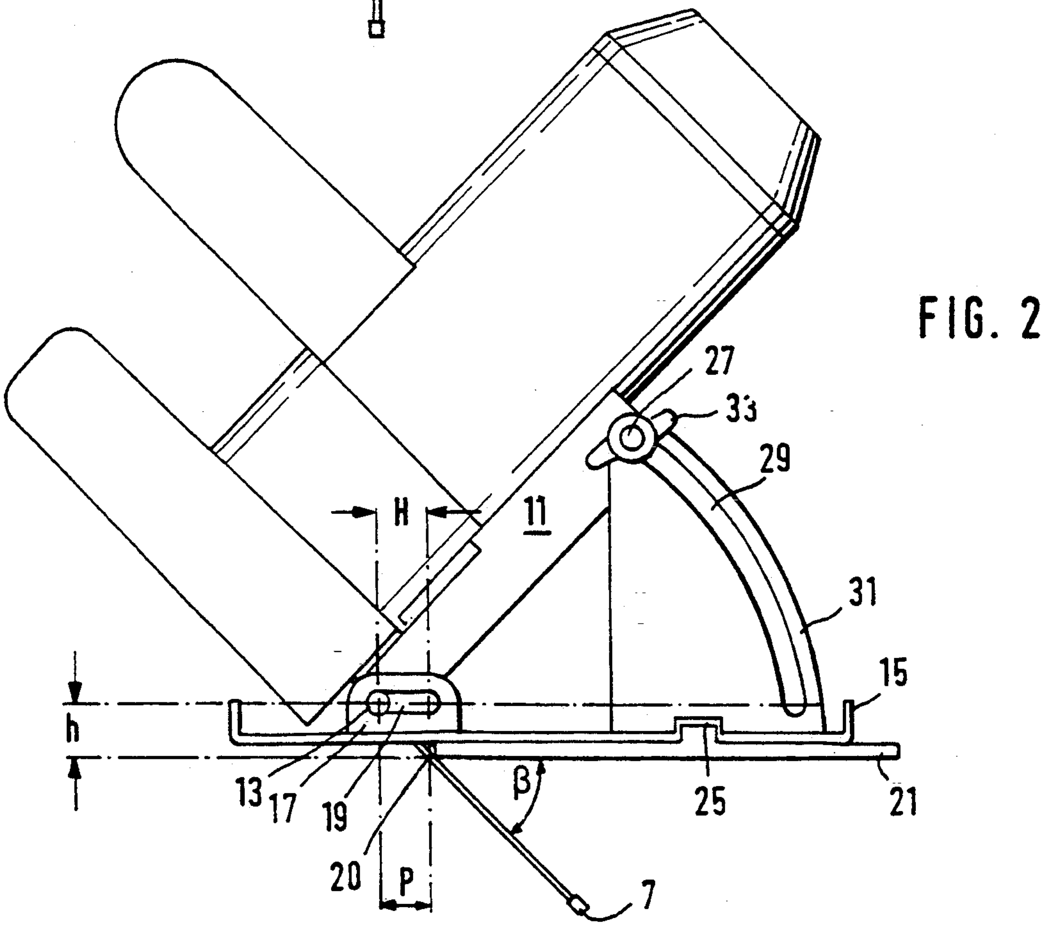
FIG. 2 is a view showing the hand circular saw of the same embodiment with the saw blade in 45° position.

FIG. 2 shows the side view of the hand circular saw 1 of FIG. 1 with the saw blade 7 in the 45° position. The turning bridge 11 with the screw pin 27 is turned to abutment against the upper end of the displacement-turning guiding path 29 of the displacement coulisse sheet 31. The turning axle 13 is displaced in the elongated opening 19 of the bearing block 17 to its outermost left edge.

The stroke of the saw blade during turning is produced in the following manner:

After releasing of the wing nut 33 the hand circular saw 1 can be moved around the turning axle 13 and arrested relative to the base plate 15 in each turning position. During turning the screw pin 27 due to the curvature of the displacement-turning guiding path 29, additionally to the rotation around the turning axle 13, performs a translatory movement. Through the turning bridge 11 the movement is transferred to the saw blade 7.

The translatory path identified as the stroke H counteracts a natural and usually unavoidable displacement P of the tool engaging line 20 of the saw blade on the workpiece with the same magnitude. The stroke H thereby compensates the displacement P which can be calculated from the tangent function of the turing angle $\beta$ and the height H of the turning axle above the upper surface of the workpiece:

$$H=P=h\times\tan\beta$$

In a further embodiment shown on the side view of FIG. 3 a hand circular saw 41 has a motor housing 43 accommodating a not shown motor which is connected with a saw shaft 45. A saw blade 47 is fixed on the saw shaft 45 by a nut 49.

The motor housing 43 is arranged on a frame-like turning bridge 51. The bridge carries a physical turning axis 53 formed as a pin or a shaft, so that the bridge is connected through the axle turnably (or tiltably) with a base plate 55. The base plate 55 and the turning axle 53 are connected with one another in a bearing block 57 located on the base plate 5, through its opening 59. The turning axle 51 is rotatably fixed in the opening 59. The base plate 55 is located on a guiding rail 61.

The turning bridge 51 at its side opposite to the turning axle 53, carries a screw pin 67. The screw pin 67 extends through a turning-guiding path 69 of a turning coulisse sheet 71 fixedly arranged on the base plate 55. By means of the screw pin 67 the turning bridge 51 is arrested by a wing nut 73 in each turning position between 90° and 45° on the turning guiding coulisse sheet 71.

For adjusting the cutting depth the motor housing 43 together with the saw blade 47 is arranged turnably up and down on the turning bridge 51. The arrangement is not shown in detail.

The turning bridge 51 carries a displacement sliding block 75 substantially centrally. The block is positively guided in a displacement turning guiding path 77 of a displacement coulisse sheet 79. The displacement coulisse sheet 79 engages with a U-shaped part 81 of a guiding rib 63 of the guiding rail 61 supported on the base plate 55 of the hand circular saw 51. The displacement coulisse sheet 79 is displaceable relative to the base plate 55 at least by the magnitude of the stroke H and secured against falling out. The arrangement is not shown in detail as well.

FIG. 4 shows a side view of the hand circular saw of FIG. 3 with the saw blade in 45° position. The turning bridge 51 with the displacement sliding block 75 is turned on the upper end of the displacement-turning guiding path 77 of the displacement coulisse sheet 79. The turning axle 53 together with the bearing block 57 is displaced relative to the guiding rail 61 to its outermost left position.

The stroke of the saw blade during turning is produced in the following manner:

After releasing the wing nut 73 the hand circular saw 41 can move about the turning axle 53 and arrested relative to the base plate 55 in each turning position. During turning, due to the curvature of the displacement-turning guiding path 77, the displacement sliding block 75 in addition to the rotation about the turning axle 73 performs a translatory movement. This movement is transmitted through the turning bridge 51 to the saw blade 43.

The translatory movement identified as the stroke H is performed parallel to the base plate with the same magnitude but in an opposite direction to the natural displacement P of the tool engaging line 60 of the saw blade on the workpiece. The stroke H is equal therefore to the displacement P and is calculated as in FIGS. 1 and 2 from the tangent function of the turning angle $\beta$ and the height H of the turning (or tilting) axle above the upper surface of the workpiece:

$$H=P=h/\tan\beta$$

In accordance with a not shown embodiment of the invention an arresting device between the screw pin and the guiding path or the displacement sliding block and the displacement-turning guiding path can be arranged. Therefore in a not shown double arrangement of the coulisse sheet provided for better stability, an inclination of the motor housing with the circular saw blade during turning is avoided.

In accordance with a further embodiment shown in FIG. 6 of the invention, preferably for works without guiding rails, a substrate 91 which corresponds to the thickness of the guiding rail can be releasably mounted at the lower side of the base plate. The stroke H can be so calculated that during the displacement of the tool engagement line it compensates the distance of the tool upper surface from the lower side of the base plate, which corresponds to the thickness of the guiding rail.

As shown in FIG. 5, two bearing blocks are provided on the base plate for supporting the turning (tilting) axle and arranged forwardly and rearwardly of the saw blade as considered in the direction downstream of a cutting point.

A mistaken damage of the guiding rail by engaging with the tool blades during turning of the saw blade is prevented due to the above positively performed stroke. The edge of the guiding rail which is located at the minimal distance from the tool always acts in an optimal manner as a cutting suppressor.

It will be understood that each of the elements described above, or two or more together, may also find a useful application in other types of constructions differing from the types described above.

While the invention has been illustrated and described as embodied in a motor driven hand circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A motor driven hand circular saw, comprising a saw blade; a base plate arranged to be positioned over a workpiece; means for supporting said saw blade displaceably parallel and tiltably about a turning axle relative to said base plate for performing inclined or bevel cuts, so that by tilting of said saw blade relative to said base plate about said axle said saw blade and said axle are displaced parallel to said base plate with a stroke which is proportional to a respective tilting angle transversely to a direction downstream of a cutting point and counteracts a natural displacement of a saw engaging line of said saw blade on the workpiece.

2. A hand circular saw as defined in claim 1, wherein said saw blade is tiltable so that said stroke is equal to the natural displacement of the tool engaging line.

3. A hand circular saw as defined in claim 1, wherein said means includes a turning axle, said saw blade together with said turning axle being displaceable parallel to said base plate during tilting of said saw blade.

4. A hand circular saw as defined in claim 1, wherein said means includes a coulisse guide which provides said displacement over the stroke.

5. A hand circular saw as defined in claim 4, wherein said coulisse guide includes a displacement coulisse sheet with a displacement-turning guiding path having a curvature corresponding to the displacement stroke, and a displacement sliding block which is positively guided in said displacement-turning guide path; and further comprising a part which carries said saw blade and turnable with said saw blade, said displacement sliding block being mounted on said turnable part.

6. A hand circular saw as defined in claim 5: and further comprising an abutment which is formed as an elongated opening extending transversely to a feed direction, and a tilting axle turnably and displaceably supported in said elongated opening, said saw blade being arrestable in its turning position on said displacement coulisse sheet.

7. A hand circular saw as defined in claim 6, wherein said tilting axle is formed as a shaft.

8. A hand circular saw as defined in claim 6, wherein said tilting axle is formed as a pin.

9. A hand circular saw as defined in claim 6, wherein said displacement coulisse sheet is mounted on said base plate.

10. A hand circular saw as defined in claim 6, wherein said displacement sliding block includes a screw pin with a wing nut which is guided in said displacement-turning guiding path of said displacement coulisse sheet, so that turning angular positions can be fixed at small distances from one another.

11. A hand circular saw as defined in claim 10, wherein said screw pin is arrestingly guided in said displacement-turning guiding path.

12. A hand circular saw as defined in claim 5; and further comprising another such displacement coulisse sheet, said displacement coulisse sheet being arranged forwardly and rearwardly of said saw plate as considered in the feed direction downstream of the cutting point.

13. A hand circular saw as defined in claim 1; and further comprising a guiding rail arranged to be positioned over a workpiece so that said base plate is guided on said guiding rail; a displacement coulisse sheet supported on said guiding rail; a turning bridge supporting said saw blade; and a motor housing arranged to accommodate a motor, said saw blade, said turning bridge, said motor housing and at least a part of said base plate being displaceable relative to . said displacement coulisse sheet transversely to a feed direction.

14. A hand circular saw as defined in claim 13, wherein said guiding rail has a guiding rib, said displacement coulisse sheet being supported on said guiding rib transversely to the feed direction, said turning coulisse sheet being arranged on said base plate for arresting a turning angle.

15. A hand circular saw as defined in claim 14; and further comprising means for arresting said turning angle, said arresting means being guided on said turning coulisse sheet so that turning angular positions can be fixed at small distances.

16. A hand circular saw as defined in claim 15, wherein said arresting means includes a wing nut.

17. A hand circular saw as defined in claim 15, wherein said arresting means includes screw pins.

18. A hand circular saw as defined in claim 14; and further comprising another such turning coulisse sheet and displacement coulisse sheet, said turning coulisse sheet and said displacement coulisse sheet being arranged forwardly and rearwardly of said saw blade as considered in the direction downstream of a cutting point.

19. A hand circular saw as defined in claim 1, wherein said means includes a tilting axle, and two bearing blocks provided on said base plate for supporting said turning axle, said bearing blocks being arranged forwardly and rearwardly of said saw blade as considered in the direction downstream of a cutting point.

20. A motor driven hand circular saw, comprising a saw blade; a base plate arranged to be positioned over a workpiece; means for supporting said blade tiltably relative to said base plate for performing inclined or bevel cuts, so that by tilting of said saw blade relative to said base plate said saw blade is displaced with a stroke which is proportional to a respective tilting angle transversely to a direction downstream of a cutting point and counteracts a natural displacement of a saw engaging line of said saw blade on the workpiece, wherein said saw blade being tiltable so that said stroke is equal to the natural displacement of the tool engaging line.

21. A motor driven hand circular saw, comprising a saw blade; a base plate arranged to be positioned over a workpiece; means for supporting said blade tiltably relative to said base plate for performing inclined or bevel cuts, so that by tilting of said saw blade relative to said base plate said saw blade in displaced with a stroke which is proportional to a respective tilting angle transversely to a direction downstream of a cutting point and counteracts a natural displacement of a saw engaging line of said saw blade on the workpiece, wherein said saw blade being tiltable about a turning axle so that said stroke is equal to the natural displacement of the tool engaging line, said saw blade together with said turning axle being displaceable parallel to said base plate during tilting of said saw blade.

* * * * *